United States Patent
Chen et al.

(10) Patent No.: US 8,576,502 B2
(45) Date of Patent: Nov. 5, 2013

(54) MINIATURIZED LENS ASSEMBLY

(75) Inventors: Chun-Hong Chen, Taichung (TW); Chao-Hsiang Yang, Taichung (TW)

(73) Assignee: Asia Optical Co. Inc., Taichung (TW)

( * ) Notice: Subject to any disclaimer, the term of this patent is extended or adjusted under 35 U.S.C. 154(b) by 0 days.

(21) Appl. No.: 13/541,679

(22) Filed: Jul. 4, 2012

(65) Prior Publication Data
US 2013/0010375 A1    Jan. 10, 2013

(30) Foreign Application Priority Data
Jul. 5, 2011    (TW) .............................. 100123695 A

(51) Int. Cl.
*G02B 9/60* (2006.01)
*G02B 13/04* (2006.01)

(52) U.S. Cl.
USPC .......................................... 359/770; 359/753

(58) Field of Classification Search
CPC ... G02B 13/004; G02B 13/0045; G02B 13/18
USPC .......... 359/659, 660, 749, 753, 763, 770, 781
See application file for complete search history.

(56) References Cited

U.S. PATENT DOCUMENTS

| | | | |
|---|---|---|---|
| 5,774,279 A * | 6/1998 | Kiriki et al. | 359/753 |
| 6,222,685 B1 * | 4/2001 | Yamada | 359/770 |
| 7,663,813 B2 * | 2/2010 | Lai | 359/770 |
| 8,107,175 B2 * | 1/2012 | Kurashige | 359/770 |
| 8,169,720 B2 * | 5/2012 | Eguchi | 359/793 |
| 8,335,043 B2 * | 12/2012 | Huang | 359/753 |

* cited by examiner

*Primary Examiner* — David N Spector

(57) ABSTRACT

A miniaturized lens assembly includes a first lens, a stop, a second lens, a third lens, a fourth lens and a fifth lens, all of which are arranged in sequence from an object side to an image side along an optical axis. The first lens is made of plastic material, is a meniscus lens with negative refractive power, and includes a convex surface facing the object side. The second lens is made of plastic material and is a biconvex lens with positive refractive power. The third lens is made of glass material and is a biconvex lens with positive refractive power. The fourth lens is made of glass material, is a biconcave lens with negative refractive power, and is adhered to the third lens to form a compound lens. The fifth lens is made of plastic material, is provided with positive refractive power, and includes an aspheric surface.

8 Claims, 10 Drawing Sheets

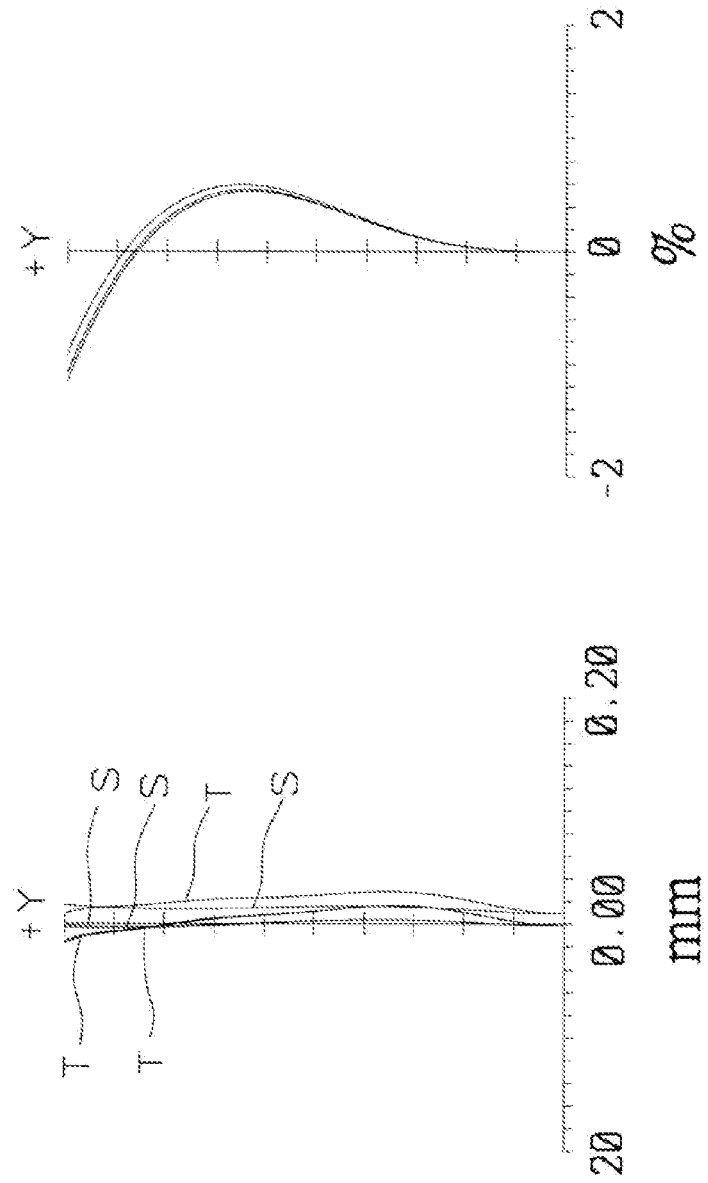

MINIATURIZED LENS ASSEMBLY

BACKGROUND OF THE INVENTION

1. Field of the Invention

The invention relates to an image capture, and more particularly to a miniaturized lens assembly.

2. Description of the Related Art

In recent years, with the progress of image science and technology, image capture devices such as cameras, video cameras, microscopes and scanners have been increasingly becoming smaller and lighter for people to conveniently carry and use. Thus, the size of the lens assembly of image capture devices is reduced significantly. In addition to miniaturization and lightweight, higher optical performance that can achieve high resolution and high contrast is required. In conclusion, miniaturization and high optical performance are two essential elements to a lens assembly.

In order to achieve the purpose of high optical performance, some lens assemblies include multiple lens groups; even more than ten pieces of lens are included. On the other hand, to achieve the purpose of lightweight and miniaturization, other lens assemblies only include a few lenses so that the optical performance can be not effectively enhanced.

As described, the known lens assemblies are not perfect yet and remain to be improved.

BRIEF SUMMARY OF THE INVENTION

Therefore, the invention provides a miniaturized lens assembly which is not only small in size but has high optical performance.

The miniaturized lens assembly of the invention includes a first lens, a stop, a second lens, a third lens, a fourth lens and a fifth lens, all of which are arranged in sequence from an object side to an image side along an optical axis. The first lens is made of plastic material, is a meniscus lens with negative refractive power, and includes a convex surface facing the object side. The second lens is made of plastic material and is a biconvex lens with positive refractive power. The third lens is made of glass material and is a biconvex lens with positive refractive power. The fourth lens is made of glass material, is a biconcave lens with negative refractive power, and is adhered to the third lens to form a compound lens. The fifth lens is made of plastic material, is provided with positive refractive power, and includes an aspheric surface.

By the above arrangements of the lenses and stop, the purpose of miniaturization and high optical performance can be achieved.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 6A is a field curvature diagram of a miniaturized lens assembly in accordance with a second preferred embodiment of the invention;

FIG. 6B is a distortion diagram of a miniaturized lens assembly in accordance with a second preferred embodiment of the invention;

FIG. 6D is a spot diagram of a miniaturized lens assembly in accordance with a second preferred embodiment of the invention.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
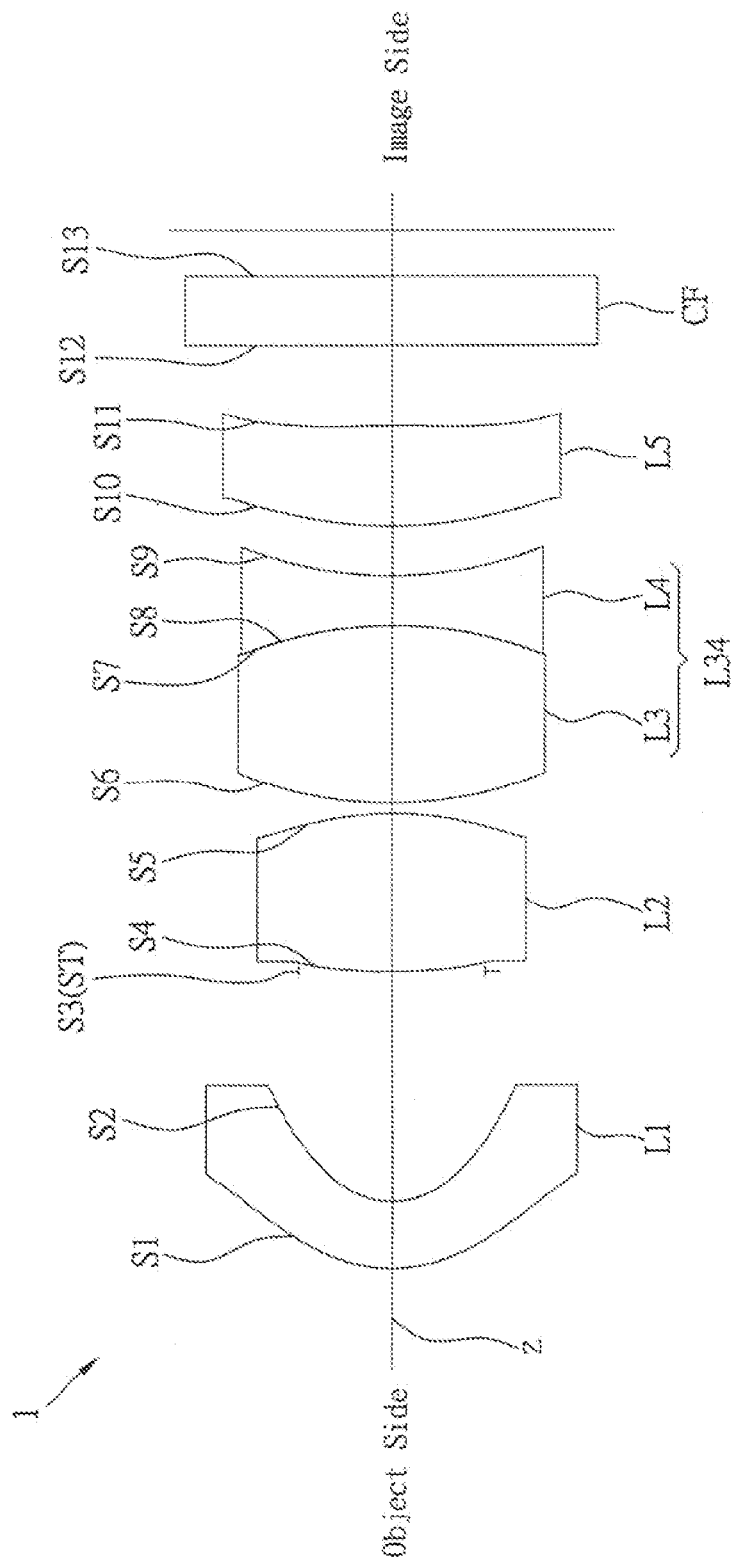
FIG. 1 is a lens layout diagram of a miniaturized lens assembly in accordance with a first preferred embodiment of the invention.
Figure 2:
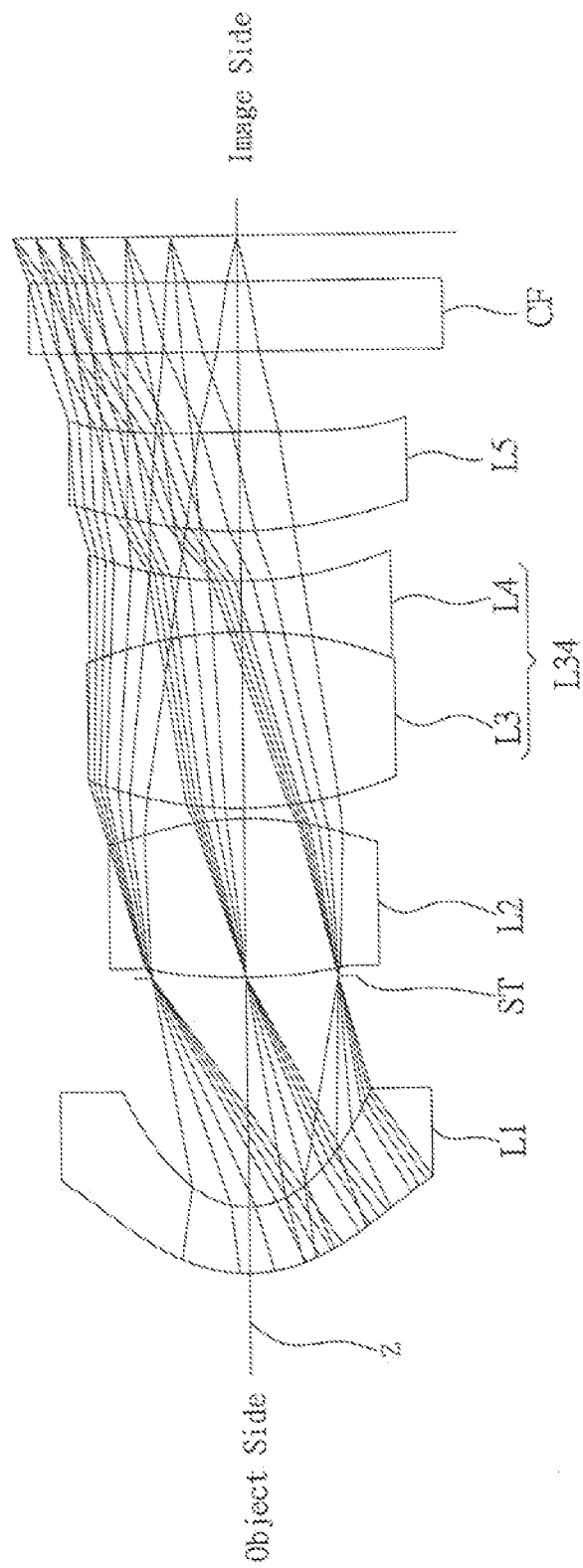
FIG. 2 is an optical path diagram of a miniaturized lens assembly in accordance with a first preferred embodiment of the invention.

Referring to FIG. 1, FIG. 1 is a lens layout diagram of the miniaturized lens assembly 1 in accordance with a first preferred embodiment of the invention. FIG. 2 is an optical path diagram of FIG. 1. With reference to FIG. 1 and FIG. 2, the miniaturized lens assembly 1 of a first embodiment of the invention is described in detail.

The miniaturized lens assembly 1 includes a first lens L1, a stop ST, a second lens L2, a third lens L3, a fourth lens L4 and a fifth lens L5, all of which are arranged in sequence from an object side to an image side along an optical axis Z. A color filter CF is provided between the fifth lens L5 and the image side. In this embodiment, the color filter CF is a piece of flat glass.

The first lens L1 is made of plastic material. The first lens L1 is a meniscus lens with negative refractive power, and the convex surface S1 of the first lens L1 faces the object side, wherein both of the convex surface S1 and concave surface S2 are aspheric surfaces.

The second lens L2 is made of plastic material. The second lens L2 is a biconvex lens with positive refractive power, wherein both convex surfaces S4 and S5 of the second lens L2 are aspheric surfaces.

The third lens L3 is made of glass material. The third lens L3 is a biconvex lens with positive refractive power.

The fourth lens L4 is made of glass material. The fourth lens L4 is a biconcave lens with negative refractive power. The concave surface S8 of the fourth lens L4 and the convex surface S7 of the third lens L3 are adhered to each other to form a compound lens L34.

The fifth lens L5 is made of plastic material. The fifth lens L5 is a meniscus lens with positive refractive power, and the convex surface S10 of the fifth lens L5 faces the object side, wherein both of the convex surface S10 and concave surface S11 are aspheric surfaces.

By the above design of the lenses and stop ST, the miniaturized lens assembly 1 has the optical performance of a shortened total track length, increased field of view angle (FOV), increased F-number (FNO), and increased chief ray angle (CRA).

In order to achieve the above purpose and effectively enhance the optical performance, the miniaturized lens assembly 1 of the first preferred embodiment of the invention is provided with the optical properties shown in Table 1, which include the focal length (F), F-number (FNO), radius of curvature (R) of each lens surface where the optical axis Z passes through, thickness (T) of each lens along the optical axis Z, refractive index (Nd) of each lens, and Abbe number (Vd) of each lens.

TABLE 1

F = 1 mm FNO = 2.0

| Surface Number | R(mm) | T(mm) | Nd | Vd | Remark |
|---|---|---|---|---|---|
| S1 | 0.5401 | 0.2283 | 1.5346 | 56.0721 | The First Lens L1 |
| S2 | 0.2859 | 0.7814 | | | |
| S3 | ∞ | 0 | | | Stop ST |
| S4 | 2.1192 | 0.5385 | 1.5346 | 56.0721 | The Second Lens L2 |
| S5 | −1.1342 | 0.0355 | | | |
| S6 | 1.4631 | 0.6030 | 1.804 | 46.5704 | The Third Lens L3 |
| S7 | −1.4631 | 0.0014 | 1.52 | 52 | Adhesive |
| S8 | −1.4631 | 0.1710 | 1.804 | 46.5704 | The Fourth Lens L4 |
| S9 | 1.4631 | 0.1700 | | | |
| S10 | 1.5261 | 0.3407 | 1.5441 | 56.0936 | The Fifth Lens L5 |
| S11 | −6.8050 | 0.2720 | | | |
| S12 | ∞ | 0.2380 | 1.5168 | 64.1673 | Color Filter CF |
| S13 | ∞ | 0.1562 | | | |

The surface sag z of each aspheric surfaces S1, S2, S4, S5, S10 and S11 in the present embodiment can be calculated by the following formula:

$$z = \frac{ch^2}{1 + [1 - (k+1)c^2h^2]^{\frac{1}{2}}} + Ah^4 + Bh^6 + Ch^8 + Dh^{10} + Eh^{12} + Fh^{14} + Gh^{16}$$

Wherein:
z: Aspheric Surface Sag;
c: Reciprocal of Radius of Curvature;
h: Radius of Surface Aperture;
k: Conic Constant;
A-G: Higher-order Coefficients of Radius of Surface Aperture In the present embodiment, the conic constant k and the higher-order coefficients A-G of the radius h of each surface aperture are shown in Table 2.

Figure 3B:
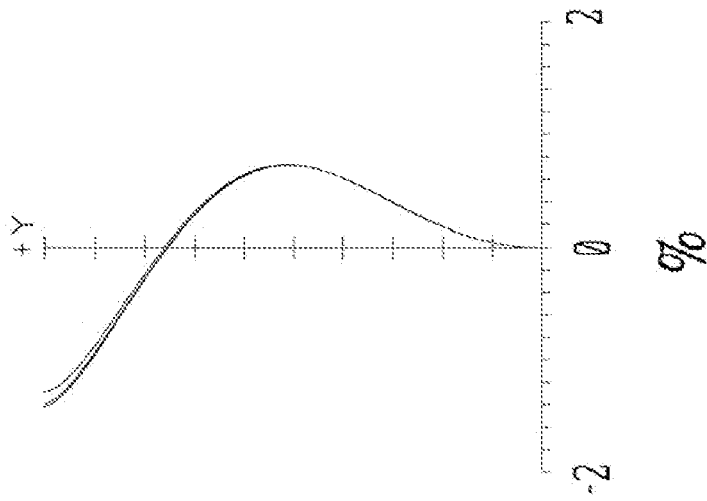
FIG. 3B is a distortion diagram of a miniaturized lens assembly in accordance with a first preferred embodiment of the invention.
Figure 3A:
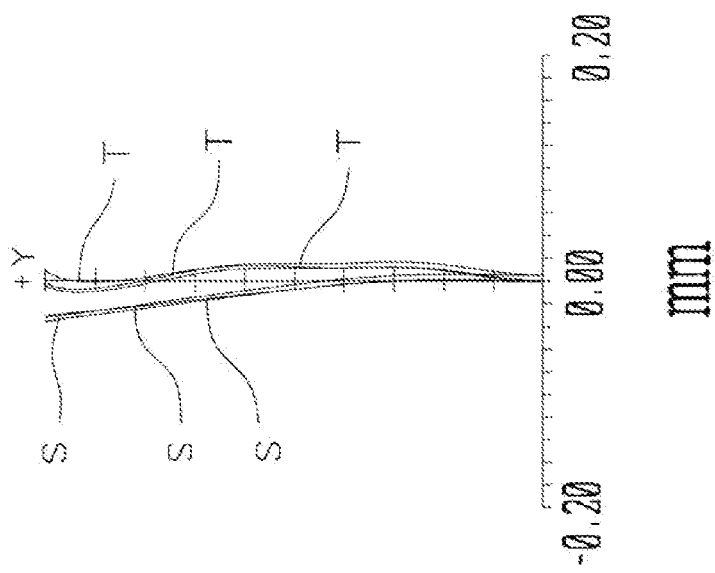
FIG. 3A is a field curvature diagram of a miniaturized lens assembly in accordance with a first preferred embodiment of the invention.
Figure 3C:
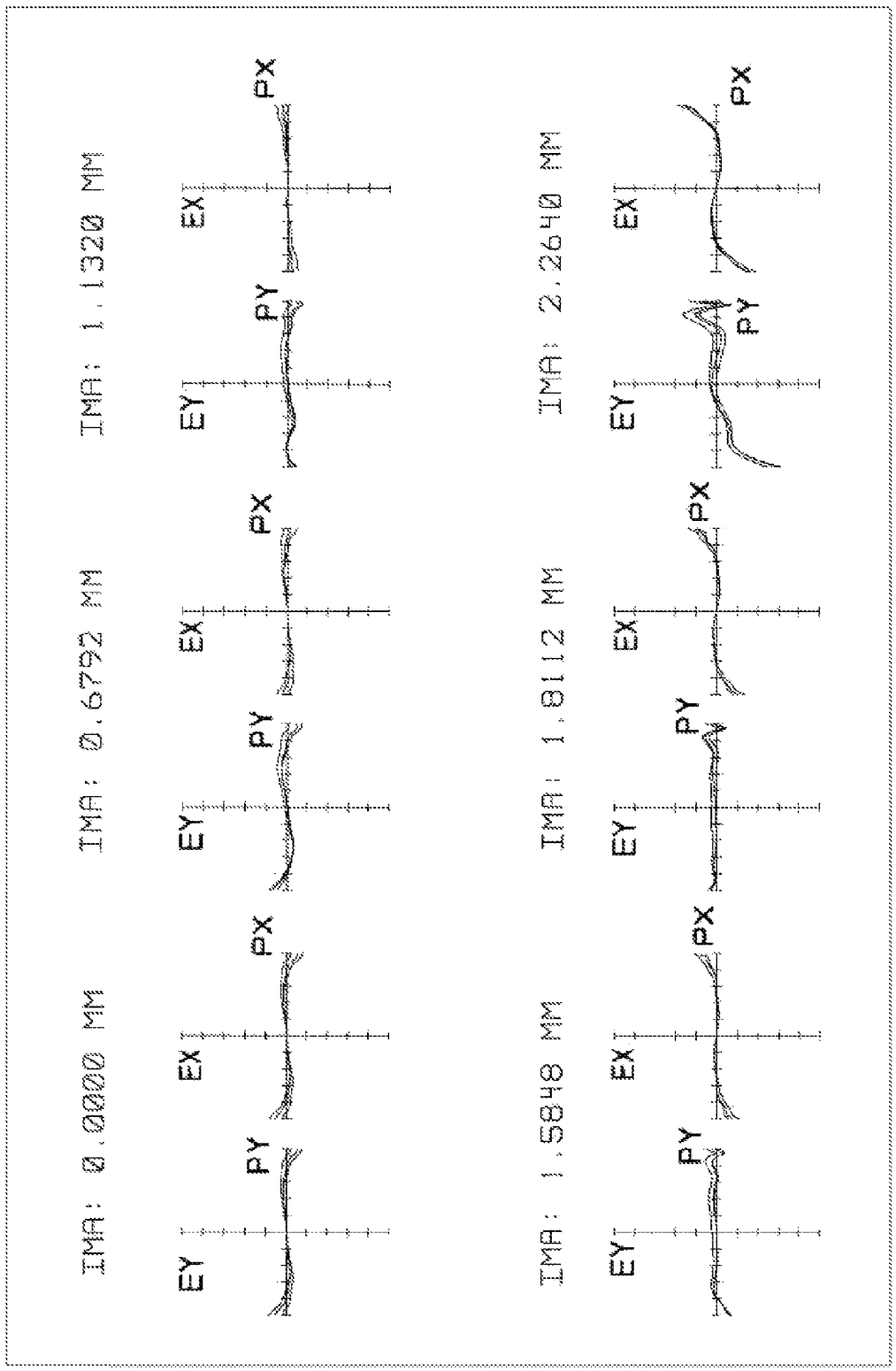
FIG. 3C is a ray fan diagram of a miniaturized lens assembly in accordance with a first preferred embodiment of the invention.
Figure 3D:
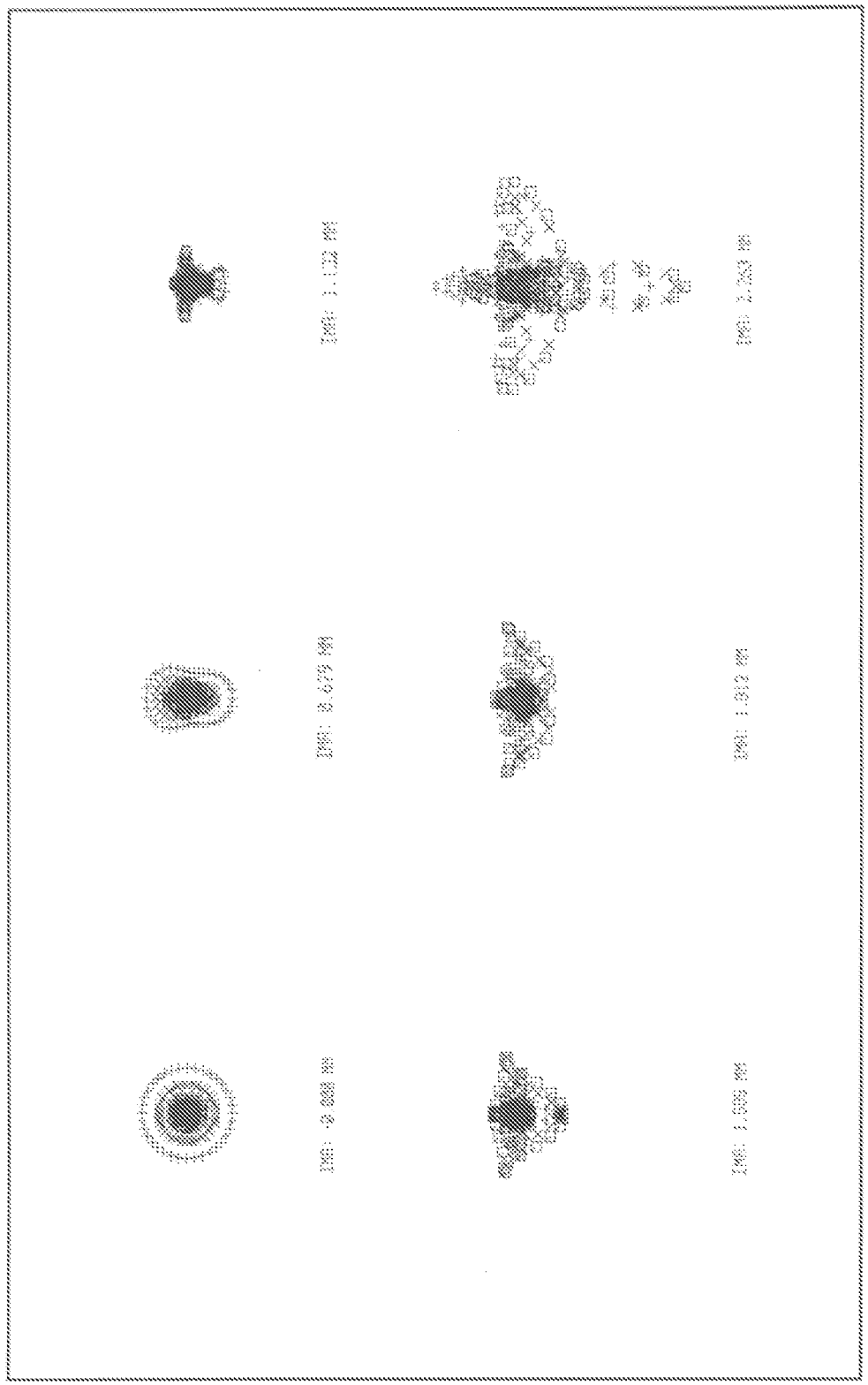
FIG. 3D is a spot diagram of a miniaturized lens assembly in accordance with a first preferred embodiment of the invention.

By the above arrangements of the lenses and stop ST, the miniaturized lens assembly 1 of the present embodiment can meet the requirements of the image quality as seen in FIGS. 3A-3D, wherein FIG. 3A shows the field curvature of the miniaturized lens assembly 1 of the present embodiment, FIG. 3B shows the distortion of the miniaturized lens assembly 1 of the present embodiment, FIG. 3C and FIG. 3D are the ray fan diagram and spot diagram in six different fields of view of the miniaturized lens assembly 1 of the present embodiment.

It can be seen from FIG. 3A that the field curvature in the present embodiment ranges between 0.02 mm and −0.04 mm. It can be seen from FIG. 3B that the distortion in the present embodiment does not exceed 1.4%. It can be seen from FIG. 3C that the resolution in the present embodiment is good in all fields of view. As shown in FIG. 3D, the Root Mean Square (RMS) radius is 2.061 μm and the Geometrical (GEO) radius is 5.118 μm, when the field of view is 0.000 mm. The Root Mean Square (RMS) radius is 1.837 μm and the Geometrical (GEO) radius is 4.984 μm, when the field of view is 0.679 mm. The Root Mean Square (RMS) radius is 1.407 μm and the Geometrical (GEO) radius is 3.805 μm, when the field of view is 1.132 mm. The Root Mean Square (RMS) radius is 2.243 μm and the Geometrical (GEO) radius is 6.699 μm, when the field of view is 1.585 mm. The Root Mean Square (RMS) radius is 2.461 μm and the Geometrical (GEO) radius is 8.306 μm, when the field of view is 1.812 mm. The Root Mean Square (RMS) radius is 5.294 μm and the Geometrical (GEO) radius is 18.000 μm, when the field of view is 2.263 mm. It is obvious that the resolution and optical performance of the miniaturized lens assembly 1 of the present embodiment can meet the requirements.

Figure 4:
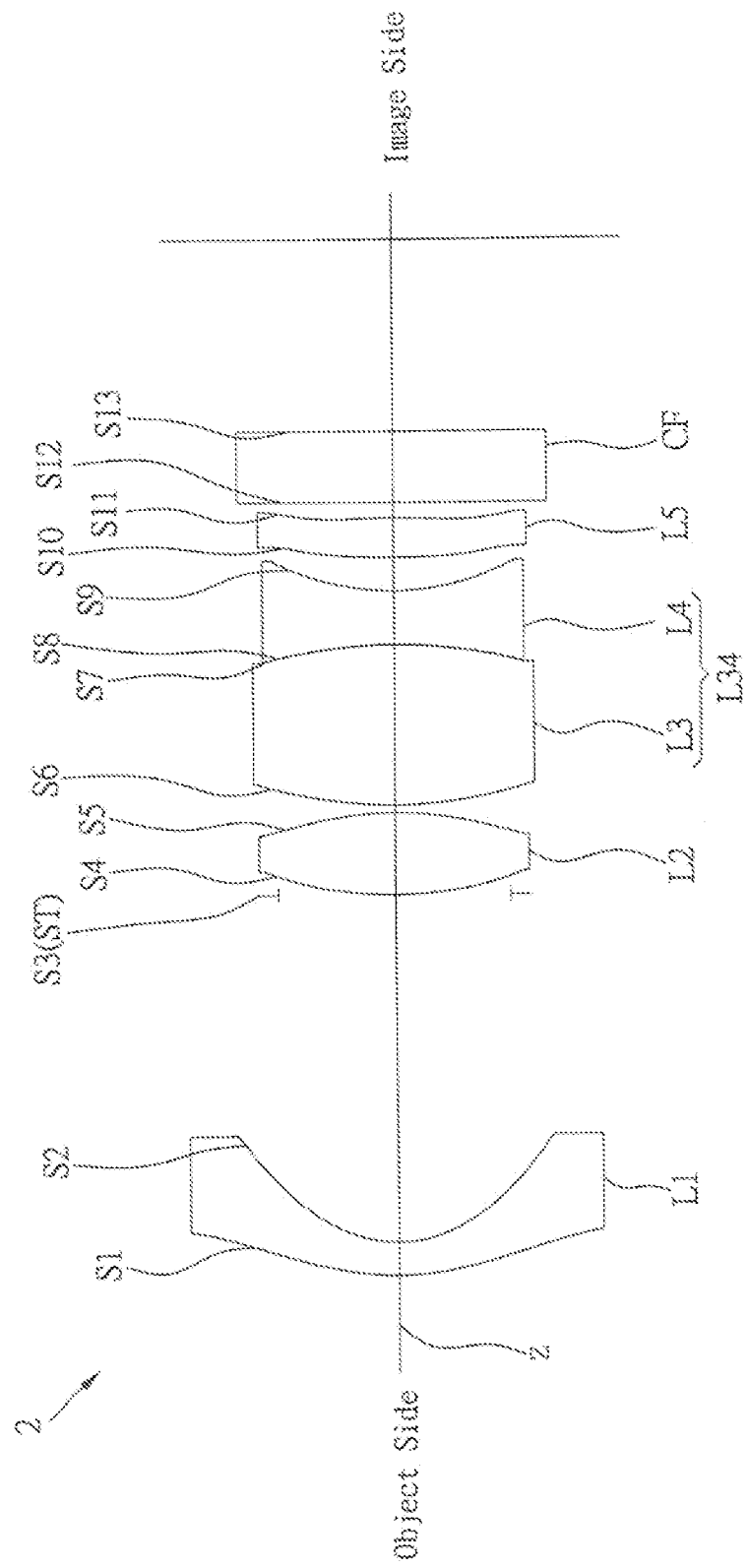
FIG. 4 is a lens layout diagram of a miniaturized lens assembly in accordance with a second preferred embodiment of the invention.
Figure 5:
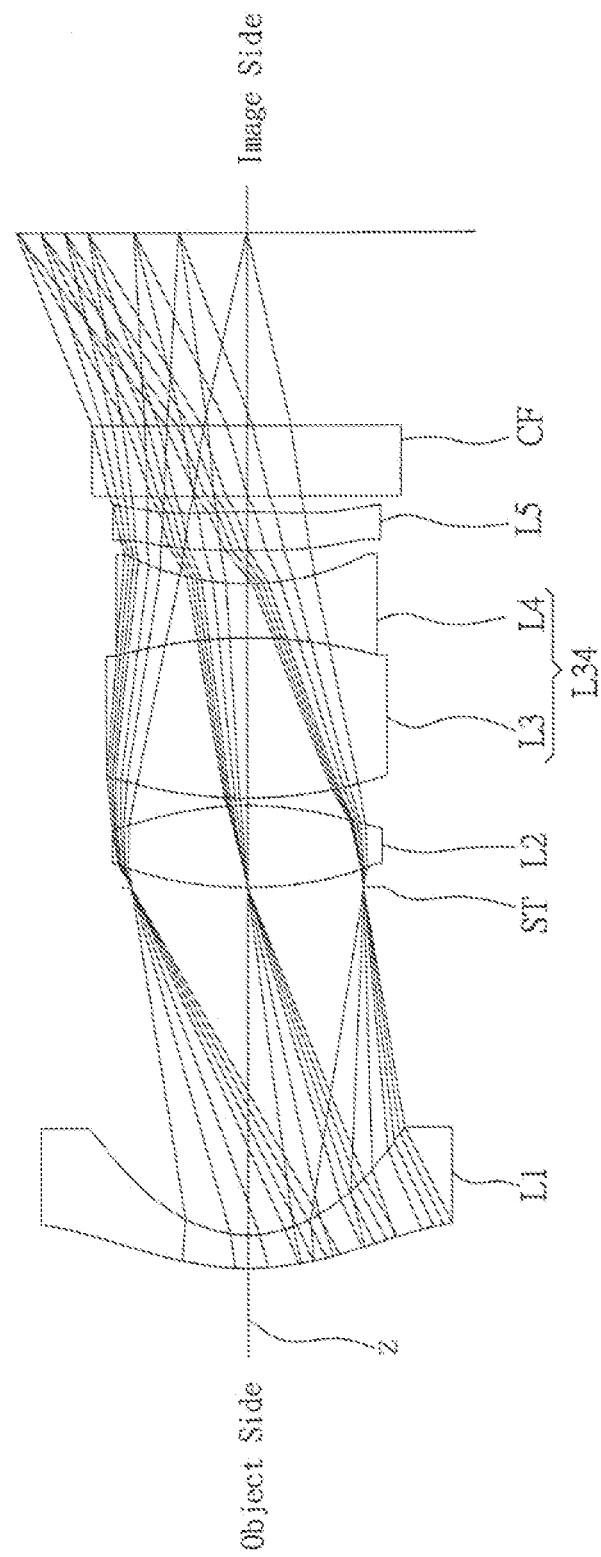
FIG. 5 is an optical path diagram of a miniaturized lens assembly in accordance with a second preferred embodiment of the invention.

The miniaturized lens assembly 1 in accordance with a first preferred embodiment of the invention is described above. With reference to FIG. 4 and FIG. 5, a miniaturized lens assembly 2 of a second embodiment of the invention is described as follows.

The miniaturized lens assembly 2 includes a first lens L1, a stop ST, a second lens L2, a third lens L3, a fourth lens L4 and a fifth lens L5, all of which are arranged in sequence from an object side to an image side along an optical axis Z. Similarly, a color filter CF is provided between the fifth lens L5 and the image side.

The first lens L1 is made of plastic material. The first lens L1 is a meniscus lens with negative refractive power, and the convex surface S1 of the first lens L1 faces the object side, wherein both of the convex surface S1 and concave surface S2 are aspheric surfaces.

The second lens L2 is made of plastic material. The second lens L2 is a biconvex lens with positive refractive power, wherein both convex surfaces S4 and S5 of the second lens L2 are aspheric surfaces.

The third lens L3 is made of glass material. The third lens L3 is a biconvex lens with positive refractive power.

TABLE 2

| Surface Number | k | A | B | C | D | E | F | G |
|---|---|---|---|---|---|---|---|---|
| S1 | −0.76015 | −0.06396 | −0.69244 | −3.72913 | 2.25698 | 14.02553 | −5.40070 | −23.05171 |
| S2 | −0.81763 | 1.15095 | −2.87712 | 45.04959 | −557.380 | 721.1843 | 14114.99 | −46653.66 |
| S4 | 6.87827 | 0.15343 | 2.60928 | −9.73694 | −103.001 | 486.0136 | 10869.64 | −64930.999 |
| S5 | −1.62531 | −0.02509 | 0.48556 | 1.18515 | 3.63937 | 16.04790 | 30.64768 | −271.72945 |
| S10 | −1.63324 | 0.02164 | −0.48570 | −0.42188 | 1.21633 | 5.44837 | 5.84624 | −24.32236 |
| S11 | 0 | 0.84782 | −1.28931 | 0.75179 | 2.19032 | −0.87941 | −7.48472 | 22.18176 |

The fourth lens L4 is made of glass material. The fourth lens L4 is a biconcave lens with negative refractive power. The concave surface S8 of the fourth lens L4 and the convex surface S7 of the third lens L3 are adhered to each other to form a compound lens L34.

The fifth lens L5 is made of plastic material. The fifth lens L5 is a meniscus lens with positive refractive power, and the convex surface S10 of the fifth lens L5 faces the object side, wherein both of the convex surface S10 and concave surface S11 are aspheric surfaces.

Similarly, by the above design of the lenses and stop ST, the miniaturized lens assembly 1 has the optical performance of a shortened total track length, increased field of view angle (FOV), increased F-number (FNO), and increased chief ray angle (CRA).

In order to achieve the above purpose and effectively enhance the optical performance, the miniaturized lens assembly 2 of the second preferred embodiment of the invention is provided with the optical properties shown in Table 3, which include the focal length (F), F-number (FNO), radius of curvature (R) of each lens surface where the optical axis Z passes through, thickness (T) of each lens along the optical axis Z, refractive index (Nd) of each lens, and Abbe number (Vd) of each lens.

TABLE 3

F = 1 mm FNO = 2.0

| Surface Number | R(mm) | T(mm) | Nd | Vd | Remark |
|---|---|---|---|---|---|
| S1 | 0.9815 | 0.1126 | 1.5346 | 56.0721 | The First Lens L1 |
| S2 | 0.4406 | 1.1694 | | | |
| S3 | ∞ | 0 | | | Stop ST |
| S4 | 1.3939 | 0.2749 | 1.5346 | 56.0721 | The Second Lens L2 |
| S5 | −1.1620 | 0.0256 | | | |
| S6 | 1.5998 | 0.5400 | 1.804 | 46.5704 | The Third Lens L3 |
| S7 | −1.7650 | 0.0014 | 1.52 | 52 | Adhesive |
| S8 | −1.7650 | 0.1830 | 1.804 | 46.5704 | The Fourth Lens L4 |
| S9 | 0.9250 | 0.1132 | | | |
| S10 | 8.0508 | 0.1308 | 1.5441 | 56.0936 | The Fifth Lens L5 |
| S11 | −2.5408 | 0.0517 | | | |
| S12 | ∞ | 0.2412 | 1.5168 | 64.1673 | Color Filter CF |
| S13 | ∞ | 0.6469 | | | |

The surface sag z of each aspheric surfaces S1, S2, S4, S5, S10 and S11 in the present embodiment can be calculated by the following formula:

$$z = \frac{ch^2}{1+[1-(k+1)c^2h^2]^{\frac{1}{2}}} + Ah^4 + Bh^6 + Ch^8 + Dh^{10} + Eh^{12} + Fh^{14} + Gh^{16}$$

Wherein:
z: Aspheric Surface Sag;
c: Reciprocal of Radius of Curvature;
h: Radius of Surface Aperture;
k: Conic Constant;
A-G: Higher-order Coefficients of Radius of Surface Aperture In the present embodiment, the conic constant k and the higher-order coefficients A-G of the radius h of each surface aperture are shown in Table 4.

TABLE 4

| Surface Number | k | A | B | C | D | E | F | G |
|---|---|---|---|---|---|---|---|---|
| S1 | −4.93328 | −0.02951 | 0.05380 | −1.22775 | −0.08118 | 6.70525 | −8.68498 | 1.71753 |
| S2 | −1.20884 | 0.53266 | 0.23047 | 6.25500 | −1.84757 | −382.90453 | 1806.7977 | −2520.6617 |
| S4 | 4.36577 | −0.11157 | −0.34990 | 2.42449 | −12.13369 | −106.83575 | 1390.3017 | −3623.4405 |
| S5 | −3.30100 | −0.00728 | 0.90580 | −4.54950 | 6.53846 | 59.75228 | 163.23883 | −964.06202 |
| S10 | 317.024 | 1.61547 | 0.68450 | −31.22076 | −105.56272 | 611.3554 | 872.52678 | −9751.0862 |
| S11 | −63.89011 | 1.73806 | 4.33268 | −35.25810 | −16.58114 | 73.44151 | −105.33971 | 1527.7732 |

Figure 6C:
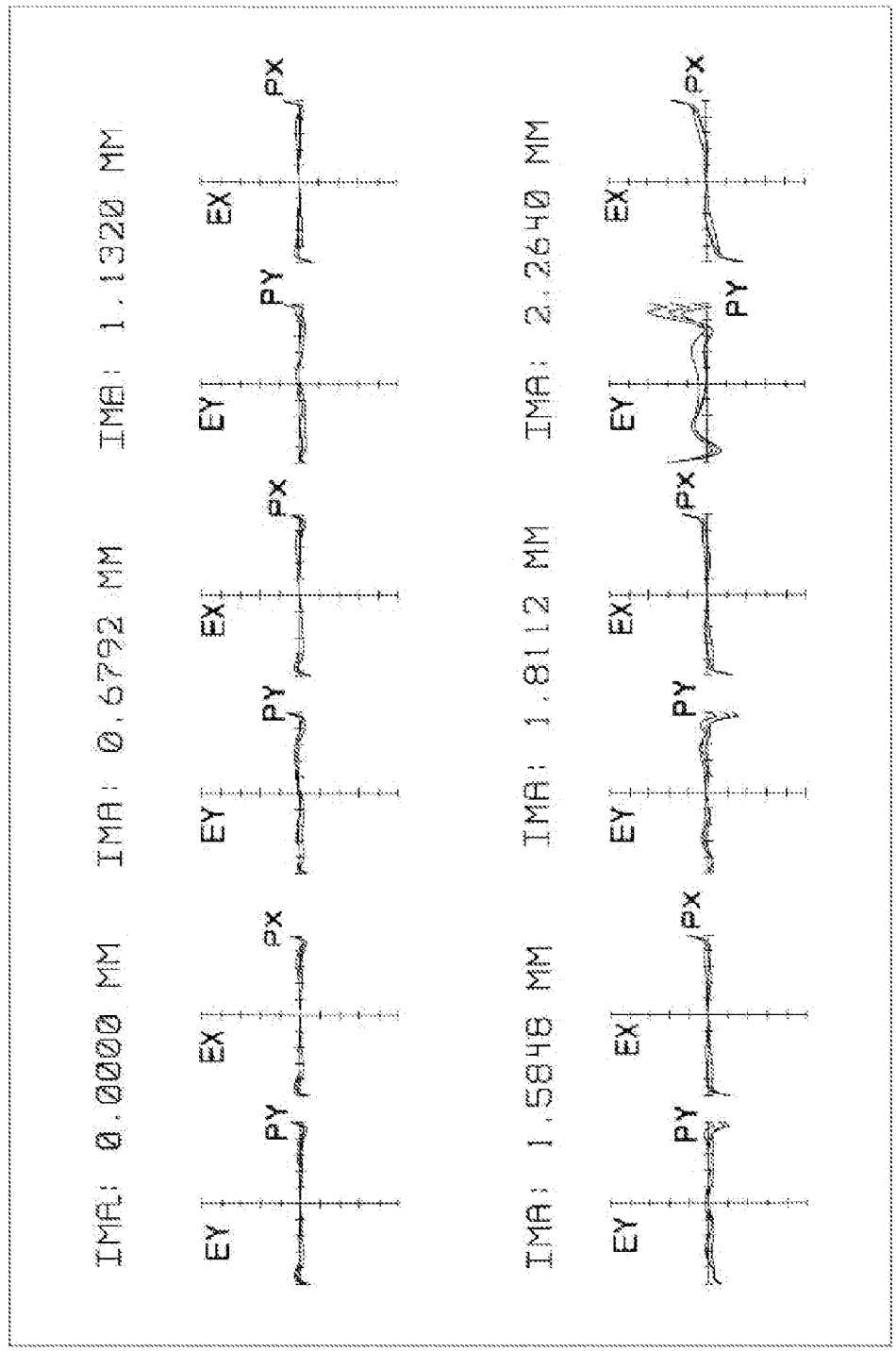
FIG. 6C is a ray fan diagram of a miniaturized lens assembly in accordance with a second preferred embodiment of the invention.
Figure 8D:
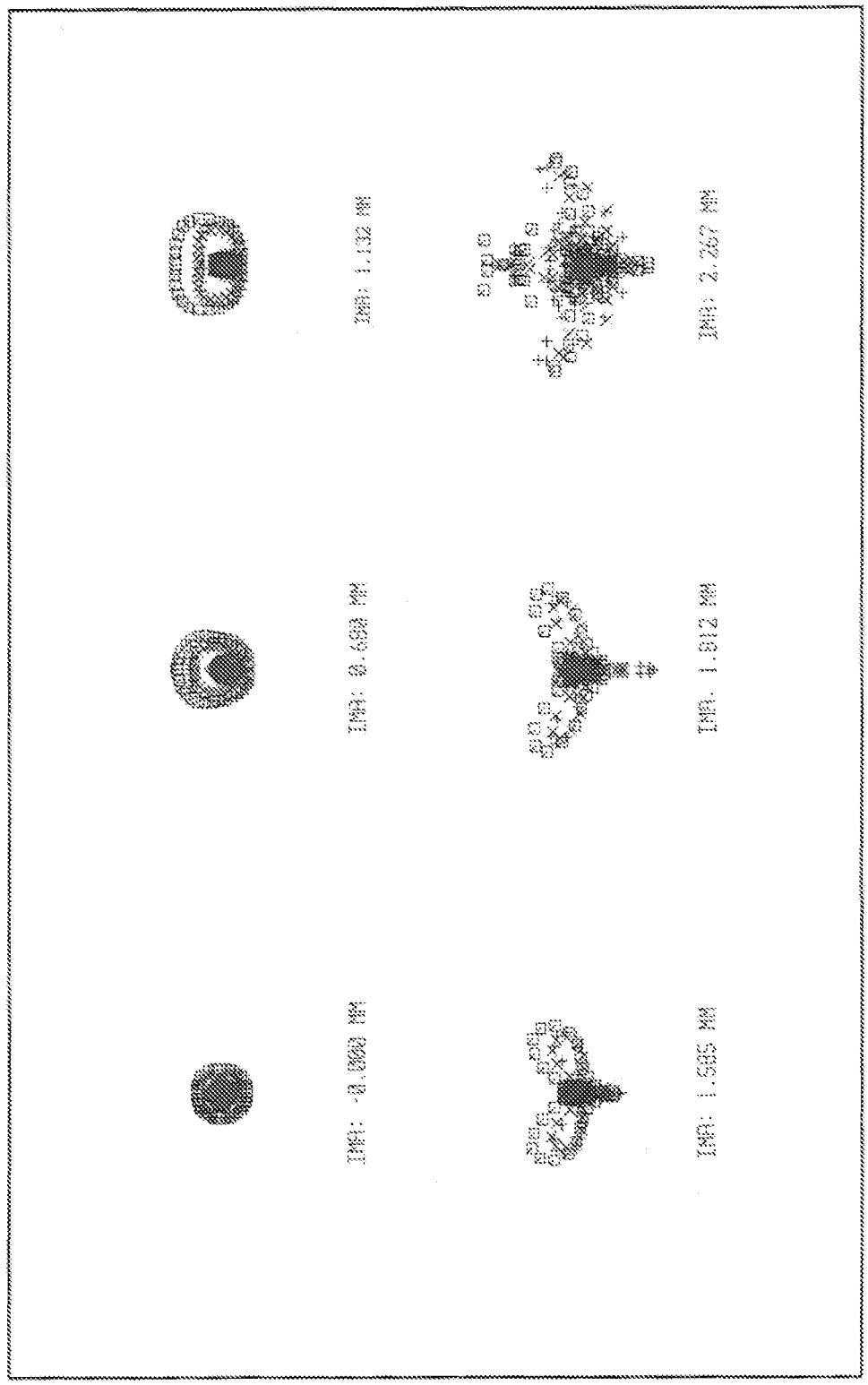

By the above arrangements of the lenses and stop ST, the miniaturized lens assembly 2 of the present embodiment can meet the requirements of the image quality as seen in FIGS. 6A-6D, wherein FIG. 6A shows the field curvature of the miniaturized lens assembly 2 of the present embodiment, FIG. 6B shows the distortion of the miniaturized lens assembly 2 of the present embodiment, FIG. 6C and FIG. 6D are the ray fan diagram and spot diagram in six different fields of view of the miniaturized lens assembly 2 of the present embodiment.

It can be seen from FIG. 6A that the field curvature in the present embodiment ranges between 0.04 mm and −0.02 mm. It can be seen from FIG. 6B that the distortion in the present embodiment does not exceed 1.2%. It can be seen from FIG. 6C that the resolution in the present embodiment is good in all fields of view. As shown in FIG. 6D, the Root Mean Square (RMS) radius is 1.388 μm and the Geometrical (GEO) radius is 2.706 μm, when the field of view is 0.000 mm. The Root Mean Square (RMS) radius is 1.863 μm and the Geometrical (GEO) radius is 4.865 μm, when the field of view is 0.680 mm. The Root Mean Square (RMS) radius is 2.059 μm and the Geometrical (GEO) radius is 6.011 μm, when the field of view is 1.132 mm. The Root Mean Square (RMS) radius is 2.310 μm and the Geometrical (GEO) radius is 8.123 μm, when the field of view is 1.585 mm. The Root Mean Square (RMS) radius is 2.678 μm and the Geometrical (GEO) radius is 9.359 μm, when the field of view is 1.812 mm. The Root Mean Square (RMS) radius is 4.494 μm and the Geometrical (GEO) radius is 14.505 μm, when the field of view is 2.267 mm. It is obvious that the resolution and optical performance of the miniaturized lens assembly 2 of the present embodiment can meet the requirements.

From the above descriptions, it is understood that the invention provides a miniaturized lens assembly which is not only small in size but has high optical performance.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A miniaturized lens assembly comprises a first lens, a stop, a second lens, a third lens, a fourth lens and a fifth lens, all of which are arranged in sequence from an object side to an image side along an optical axis, wherein:

the first lens is made of plastic material, is a meniscus lens with negative refractive power, and comprises a convex surface facing the object side;

the second lens is made of plastic material and is a biconvex lens with positive refractive power;

the third lens is made of glass material and is a biconvex lens with positive refractive power;

the fourth lens is made of glass material, is a biconcave lens with negative refractive power, and is adhered to the third lens to form a compound lens; and the fifth lens is made of plastic material, is provided with positive refractive power, and comprises an aspheric surface.

2. The miniaturized lens assembly as claimed in claim 1, further comprising a color filter disposed between the fifth lens and the image side, wherein the color filter is a piece of flat glass.

3. The miniaturized lens assembly as claimed in claim 1, wherein the first lens further comprises a concave surface, and at least one of the convex surface and the concave surface is an aspheric surface.

4. The miniaturized lens assembly as claimed in claim 3, wherein both the convex surface and the concave surface are aspheric surfaces.

5. The miniaturized lens assembly as claimed in claim 1, wherein the second lens comprises two convex surfaces, at least one of which is an aspheric surface.

6. The miniaturized lens assembly as claimed in claim 5, wherein the two convex surfaces of the second lens are aspheric surfaces.

7. A miniaturized lens assembly comprises a first lens, a stop, a second lens, a third lens, a fourth lens and a fifth lens, all of which are arranged in sequence from an object side to an image side along an optical axis, wherein:

the first lens is made of plastic material, is a meniscus lens with negative refractive power, and comprises a convex surface facing the object side;

the second lens is made of plastic material and is a biconvex lens with positive refractive power;

the third lens is made of glass material and is a biconvex lens with positive refractive power;

the fourth lens is made of glass material, is a biconcave lens with negative refractive power, and is adhered to the third lens to form a compound lens;

the fifth lens is made of plastic material, is a meniscus lens with positive refractive power, and comprises a concave surface and a convex surface;

the convex surface of the fifth lens faces the object side; and at least one of the concave surface and the convex surface of the fifth lens is an aspheric surface.

8. The miniaturized lens assembly as claimed in claim 7, wherein both the convex surface and the concave surface of the fifth lens are aspheric surfaces.

* * * * *